(12) United States Patent
Meiyappan et al.

(10) Patent No.: US 7,100,133 B1
(45) Date of Patent: Aug. 29, 2006

(54) COMPUTER SYSTEM AND METHOD TO DYNAMICALLY GENERATE SYSTEM ON A CHIP DESCRIPTION FILES AND VERIFICATION INFORMATION

(75) Inventors: Subramanian S. Meiyappan, San Jose, CA (US); Varaprasad Vajjhala, Campbell, CA (US); Edward M. Petryk, Pheonix, AZ (US)

(73) Assignee: Koninklijke Philips Electronics N.V, Eindhoven (NL)

( * ) Notice: Subject to any disclaimer, the term of this patent is extended or adjusted under 35 U.S.C. 154(b) by 1330 days.

(21) Appl. No.: 09/602,422

(22) Filed: Jun. 23, 2000

(51) Int. Cl.
*G06F 17/48* (2006.01)
(52) U.S. Cl. .............................. 716/5; 716/4
(58) Field of Classification Search ............ 716/4, 716/5, 17, 18
See application file for complete search history.

(56) References Cited

U.S. PATENT DOCUMENTS

| | | | | |
|---|---|---|---|---|
| 5,428,791 | A * | 6/1995 | Andrew et al. | 717/107 |
| 5,841,663 | A * | 11/1998 | Sharma et al. | 716/18 |
| 5,903,475 | A * | 5/1999 | Gupte et al. | 703/16 |
| 6,102,961 | A * | 8/2000 | Lee et al. | 716/1 |
| 6,118,938 | A * | 9/2000 | Lawman et al. | 716/1 |
| 6,145,073 | A * | 11/2000 | Cismas | 712/25 |
| 6,311,309 | B1 * | 10/2001 | Southgate | 703/13 |
| 6,370,493 | B1 * | 4/2002 | Knapp et al. | 703/14 |

OTHER PUBLICATIONS

Blaner, "RTL design source management for sysytem on a chip designs", Sep. 1998, IEEE, pp. 147-152.*

* cited by examiner

*Primary Examiner*—Stacy A. Whitmore
(74) *Attorney, Agent, or Firm*—Peter Zawilski

(57) ABSTRACT

The present invention facilitates automation of system on a chip (SoC) design, manufacture and verification in a convenient and efficient manner. In one embodiment, a SoC netlist builder and verification computer system of the present invention includes a user interface module, a parameter application module, an expert system module and a chip level netlist generation module. The user interface module provides user friendly and convenient interfaces that facilitate easy entry and modification of user selections and parameters. The parameter application module interprets information supplied by the user module and the expert system module and creates directions (e.g., command lines) passed to other modules for execution. The expert system module analyzes information and automatically provides SoC building and verification data including automated addition of default architectural features, automated insertion of default parameters, and automated input of information to the verification module. The chip level netlist generation module automatically generates a chip level netlist, including the instantiation of internal IC devices and connections between the circuit blocks for internal signals. The verification module automatically generates a test bench and a logical verification environment including simulation models (e.g., a chip model and a system level model).

14 Claims, 16 Drawing Sheets

```
proc do_timers{}
{
    if { ${ : : VPB0.TIMERS_numelements} > 0 } {
    set DSGN_PARAM "timer -tsize 32 -psize 32 -psize 32 -pcons '0' -pdmax 1 -nmr
NMR -extm Y_N_MASK -nc r NCR -t 2 -areset 2 -0 TIMERNAME"
    set i 0
    while (${ : : VPB0.TIMERS_numelements > $i) {
        set DSGN_PARAM_COPY $DSGN_PARAM
        #-- if we have only one timer we make sure
        #-- that we do not use index elements
        if (${ : : VPB0.TIMERS_numelements} = = 1} {
        set devicename "timer"
        set tmpstr ""
    } else {
        set devicename "timer$i"
        set tmpstr "$i"
    }
```

FIG 4A

```
    regsub -all "NMR" $DSGN_PARAM_COPY [set
::VPB0.TIMERS$i.NUM_MATCH] DSGN_PARAM_COPY
    regsub -all "Y_N_MASK" $DSGN_PARAM_COPY [set
::VPB0.TIMERS$i.MATCH_INT] DSGN_PARAM_CO
PY
    regsub -all "NMR" $DSGN_PARAM_COPY [set ::VPB0.TIMERS$i.NCR]
DSGN_PARAM_COPY
    regsub -all "TIMERNAME" $DSGN_PARAM_COPY $ (devicename}
DSGN_PARAM_COPY
```

FIG 4B

```
    lappend : : library_list "library $ {devicename}_lib; \nuse
${devicename}_lib.$(devicename)_pkg.all; \n"
        lappend: : vpb_dev_name $ {devicename}
        lappend: : gate_count [list - n "Timer $i " -g 6135 -sg " " -t $y ]
```

FIG 4C

```
lappened : : sgnl_name "VPB Timer $devicename"
lappened : : sgnl_name "tmr$ {tmpstr}_pause I 1I 1 "
lappened : : clk_dst_name "ct_tmr${devicename}_pclk I ck_nbclk"
set iinfo ""
lappened iinfo "u_tmr$tmpstr I timer$tmpstr I VPB Timer $tmpstr"
lappened iinfo "pclk I ct_tmr$ {tmpstr}_pclk I VPB Bus Clock"
lappened iinfo "pstb I pstb I VPB Peripheral Strobe "
lappened iinfo "psel I psel_tmr${tmpstr} I VPB Peripheral Select"
lappened iinfo "pwrite I pwrite I VPB Peripheral Write"
lappened iinfo "pd I pd I VPB Data Bus (31:0)"
if ( [set : : VPB0.TIMERS$i.NCR] > 0 ) {
    lappend : : assign_list " Tie off capture Inputs "
    lappend : : assign_list "tmr$ {tmr$(tmpstr}_capture I (expr (($: : LANGUAGE) = =
(LANG_VHDL ) ) ?( (others =>logic_0I) : {logic_0)] "
    lappend iinfo "capture I tmr$((tmpstr)_capture I Timer Capture Signals"
    lappened : : sgnl_name "tmr$ {tmpstr]_capture I set : : VPB0.TIMERS$i.NCR] !"
}
if ( [set : : VPB0.TIMERS$i.NUM_MATCH] > 0} (
    lappened iinfo "nint I tmr${tmpstr}_int I Timer Interrupt, Active Low"
    lappened : : intr_src "${devicename}_nint"
}
it ( [set : : VPB0.TIMERS$i.NCR] > 0 / / [set : : VPB0.TIMERS$i.NUM_MATCH] > 0} {
    lappened iinfo "pnres / ct_tmr$(tmpstr)_pures I VPB Asynchronous Timer Reset"
    lappened iinfo "pa I pa(5 downto 0) I VPB Address Bus (5:0)"
    lappened : : rst_dst_name "rs_tmr$(tmpstr)_pnres I cg_nbclk"
} else (
    lappened iinfo "pa I pa(4 downto 0) I VPB Address Bus (5:0)"
}
lappend iinfo "pause I tmr$(tmpstr)_pause I Timer Pause"
lappend : : assign_list "Tie off pause Inputs "
lappend : : assign_list " tmr$(tmpstr)_pause I logic_0"
#- - Based on the number of match outputs, we create interrupt sources
if {[set : : VPB0.TIMERS$i.MATCH_INT] = = 1} (
    set j 0
    while ( [set : : VPB0.TIMERS$i.NUM_MATCH] > $j} (
        lappend : : intr_src "${devicename}_m$j"
        lappend iinfo "m$j I tmr${tmpstr}_m$j I Timer $tmpstr External Match $j Output incr j
    }
}
lappend iinfo "scantestmode I scantestmode I Scan Test Mode"
lappend : : inst_list $iinfo
```

FIG 5

```
proc create_chipcore {} {
    set ccfid [open "$::WORK_DIR/$::COMPONENTNAME/chip/top/chipcore.v" "a"]
    # Module and port type declaration has already been written by padring.tcl
    foreach elem $::sgnl_name {
        regsub { [/\t]+$} $elem {} elem
        set selem [split $elem "/"]
        switch [llength $selem] {
            1 { puts $ccfid "$(::comment) [string trim [lindex $selem 0] ]" }
            2 { set swidth [lindex $selem 1] ; puts $ccfid [format " wire %7s %s" [expr ($swidth==1) ? {}: {\[[ expr $swidth-1] \:0 \]}] "string trim [lindex $selem 0] ] ;"] }
            3 { set swidth [lindex $selem 1]; puts $ccfid [format " wire %7s %-40s ${::comment} %s" [expr ($swidth==1) ? {}: {\[ [ expr $swidth- 1 ] \: 0\]}] "string trim [lindex $selem 0]]; " [string trim [lindex $selem 2 ] ] ] }
        }
    }
}
```

FIG 6A

```
puts $ccfid "${::comment} Reset and Clock signals"
foreach elem [ concat $::rst_dst_name $::clk_dst_name] {
    set selem [split $elem "/"]
    puts $ccfid [ccfid [format " wire       %s; " [string trim [lindex $selem 0] ] ]
}
puts $ccfid "\n[string repeat $::comment 30]"
puts $ccfid "$::comment Assign statements"
puts $ccfid "\n[string repeat $::comment 30] \n"
```

FIG 6B

```
# Based on the assign_list, generate the HDL assign statements as required.
foreach elem $::assign_list {
    regsub { [ /\t]+ $elem {} elem
    set aelem [split $elem "/"]
    if { [llength $aelem]==1} {
        puts $ccfid "$(::comment) [lindex $aelem 0]"
    } else {
        if {{$::LANGUAGE}=="LANG_VHDL"} {
            puts $ccfid [format " %15s <= %s; " [string trim [lindex $aelem 0 ] ] [string trim [lindex $aelem 1 ]]]
        } else {
            puts $ccfid [format " assign %15s = %s; " [string trim [lindex $aelem 0 ] ] [string trim [lindex $aelem 1]]]
        }
    }
}
```

FIG 6C

```
proc create_chipcore () {
    set ccfid [open "$ : : WORK_DIR/ S : : COMPONENTNAME/chip/top/chipcore.v"
"a"]

Module and port type declaration has already been written by padring.tcl

# Based on the sgnl_name list, which contains all the internal signals
# that must be generated for proper connectively, create the actual
# VHDL or Verilog code that will perform that task.
    foreach elem $ : : sgnl_name ( foreach iinfo $: : inst_list {
        set first 1
        set istr " "
        foreach pmap $iinfo {
            regsub -all { [ \t] *\/ [ \t]*} $pmap {/ } pmap
            set pelem [split $pmap {/ }]
            if { $first } {
                set first 0
                    append istr "\n$( : : comment) (string repeat $ {: : comment} 37] \n"
                    append istr "$( : : comment} [lindex $pelem 2]\n"
                    append istr "$( : : comment) (string repeat S {: : comment) 37] \n"
                append istr "    [lindex $pelem 1 ] [lindex $pelem 0]  (\n"
            } else {
                set formal [lindex $pelem 0]
                set actual [lindex $pelem 1]
                if {($ : : LANGUAGE) = = "LANG_VERILOG"} {
                    regsub -all {\( } $actual {[ } actual
                    regsub -all {\( } $actual {] } actual
                        regsub {open} $actual {} actual
                    regsub - all "downto " $actual ": " actual
                    regsub {\(} $formal {[} formal
                    regsub {\)} $formal {]} formal
                    regsub " downto " $formal ":" formal
                }
                append istr "    .$formal ($actual) , \n"
        } regsub {, \n$} $istr " ) ; " istr
        puts $ccfid $istr
    }
    puts $ccfid "\n\nendmodule \n"
```

FIG 7

COMPUTER SYSTEM AND METHOD TO DYNAMICALLY GENERATE SYSTEM ON A CHIP DESCRIPTION FILES AND VERIFICATION INFORMATION

FIELD OF THE INVENTION

The present invention relates to the field of automated integrated circuit (IC) design. More particularly, the present invention relates to system on a chip design and verification system and method that constructs IC hardware description files of systems on a chip from functional building blocks circuits while concurrently taking into account numerous chip level design aspects along with the generation of a simulation environment for design verification.

BACKGROUND OF THE INVENTION

Electronic technologies such as digital computers, calculators, audio devices, video equipment and telephone systems have facilitated increased productivity and reduced costs in a number of activities, including the analysis and communication of data, ideas and trends in most areas of business, science, education, and entertainment. There are a number of different complex electronic Application Specific Integrated Circuits (ASICs) that have contributed to the realization of these benefits. Design of ASICs often involves the design of various building block circuits that make up the ASIC. Significant resources are usually expended performing the design tasks associated with designing connection between building block circuits and adding the necessary support logic to complete a system on a chip (SoC), such as adding input/output (I/O) cells, clock distribution and test logic. After a design is complete, even more resources are typically expended verifying the operation via simulation.

Designing complex electronic systems and circuits requires arduous analysis of numerous electrical characteristics, including the performance of extensive calculations and manipulation of complicated electrical principles of physics. Typically an analysis becomes even more complex when designers attempt to integrate numerous electronic components on a single integrated circuit chip, giving rise to a variety of factors requiring careful review and attention. Engineers regularly rely on computer aided engineering (CAE) design tools to assist with many of the complicated manipulations, computations and analyses that are required to design electronic circuits, especially when a large part of the design is included in an integrated chip. Circuits being designed or analyzed usually include resistors, capacitors, inductors, voltage and current sources, switches, uniform distributed RC lines, and common semiconductor devices such as bipolar junction transistors (BJT), junction field effect transistors (JFET), metal oxide surface field effect transistors (MOSFET), etc. A good analysis typically involves a review of numerous electrical characteristics associated with each component.

Many CAE tools utilize netlists of hardware description language (HDL) files to describe the architectural and functional characteristics of a design. HDL files are usually textual descriptions of the logical functions a circuit performs. The textual descriptions are utilized in a synthesis process that turns the conceptual textual description of the design into a "logical gate" description. For example register transfer level (RTL) functional description file with an implied architecture is translated into a gate level description. Even after a CAE design is completed significant resources are expended verifying the design in silicon.

IC chips typically include various functional circuit blocks that are coupled together and to Input/Output (IO) cells. Through design reuse, significant advantages are usually achieved through "reuse" of basic building block circuits that have been previously verified in silicon. Although the internal design of the previously verified building block circuits does not significantly change, they usually are required to exhibit different behavior in different applications and typically have significantly distinct interfaces from one application to another. Coupling the HDL descriptions of different functional circuit blocks together, generating HDL descriptions of inputs and outputs (IOs) based on the choice of interfaces, adding system level logic for clocking and testing, generating a test bench and the tests to verify the functionality and connectivity of an IC are typically tedious tasks consuming significant resources. In addition, these design and test activities associated with coupling the different HDL descriptions of functional circuit blocks together are error prone, especially when manual intervention or complex coordination is required.

Valuable experience and information associated with previous design and actual manufacturing of electronic systems is often not available to new design teams. Typically new designs are generated by teams of engineers that do not include engineers that participated in the original design of a circuit block. The new teams of engineers often do not know the circuit block was previously designed, manufactured, tested and debugged and perform these tasks themselves. Even if the new team includes engineers with experience designing and manufacturing a circuit block, remembering previous designs and circuit block descriptions is often difficult.

Accordingly, what is required is a system and method that facilitates efficient creation of IC netlist designs utilizing existing circuit block information. The system and method should assist a designer to design an IC netlist in a convenient manner and facilitate incorporation of building block circuits previously tested in silicon. The system and method should reduce the amount of data a user has to enter manually to adequately describe features of the circuit being designed or analyzed.

SUMMARY OF THE INVENTION

The present invention is a system and method that facilitates efficient and effective creation, modification and verification of electrical circuit designs utilizing existing circuit block designs. The system on a chip (SoC) netlist builder and verification system and method of the present invention assists a designer to design an integrated circuit (IC) in a convenient manner and facilitates incorporation of building block circuits that have been previously verified and tested in silicon. The SoC netlist builder and verification system and method minimizes the amount of data a user has to enter manually to adequately describe features of the circuit being designed or verified. The present invention system and method automatically provides a chip level netlist description, a test bench, clock descriptions, test logic descriptions, simulation models, and simulation environments.

In one embodiment of the present invention, an integrated circuit (IC) SoC netlist builder and verification system and method is implemented in a computer system. The SoC netlist builder and verification system and method includes a graphical user interface (GUI), a parameter application module, an expert system module, and a chip level netlist generation module. The GUI module provides user friendly and convenient interfaces that facilitate easy entry and modification of user selections and parameters. In one embodiment the present invention also accommodates text file entry of parameters. The parameter application module analyzes information supplied by the GUI module to interpret the user selections and parameterization (e.g., creates directions (command lines) passed to other modules for execution). The expert system utilizes information derived from past experience designing, manufacturing and verifying circuit blocks to automatically provide circuit block netlist descriptions and parameters from a storage source (e.g., database, distributed resource, memory, etc.). The chip level netlist generation module automatically generates a chip level netlist, including the instantiation of internal IC devices and connections between the circuit blocks for internal signals. In one embodiment of the present invention, an SoC netlist builder and verification system and method also includes a verification module that automatically verifies the behavior of the modeled IC.

DESCRIPTION OF THE DRAWINGS

The accompanying drawings which are incorporated in and form a part of this specification, illustrate embodiments of the invention and together with the description, serve to explain the principles of the invention:

FIG. 4A is a table comprising one exemplary implementation of a present invention parameter application module.

FIG. 4B is a table comprising one exemplary implementation of instructions for directing an SoC netlist builder and verification system and method of the present invention to perform an update of a specific copy of a parameterizable command line string associated with a timer.

FIG. 4C is a table comprising one exemplary implementation of instructions for directing an SoC netlist builder and verification system and method of the present invention to append these design functions associated with a timer.

FIG. 5 is a table comprising one exemplary implementation of instructions for directing an SoC netlist builder and verification system and method of the present invention to perform the generation of an internal integration list associated with a timer device.

FIG. 6A is a table comprising one exemplary implementation of instructions for directing an SoC netlist builder and verification system and method of the present invention to perform the creation of the actual hardware description language VHDL or Verilog code utilized in creating a netlist description of a timer device and storing the netlist description in a desired memory location.

FIG. 6B is a table comprising one exemplary implementation of instructions for directing an SoC netlist builder and verification system and method of the present invention to perform the creation of the signal declarations.

FIG. 6C is a table comprising one exemplary implementation of instructions for directing an SoC netlist builder and verification system and method of the present invention to generate HDL assignment statements.

FIG. 7 is a table comprising one exemplary implementation of instructions for directing an SoC netlist builder and verification system and method of the present invention to perform the generation of the HDL code that will instantiate each of those components.

BEST MODE FOR CARRYING OUT THE INVENTION

Figure 1:
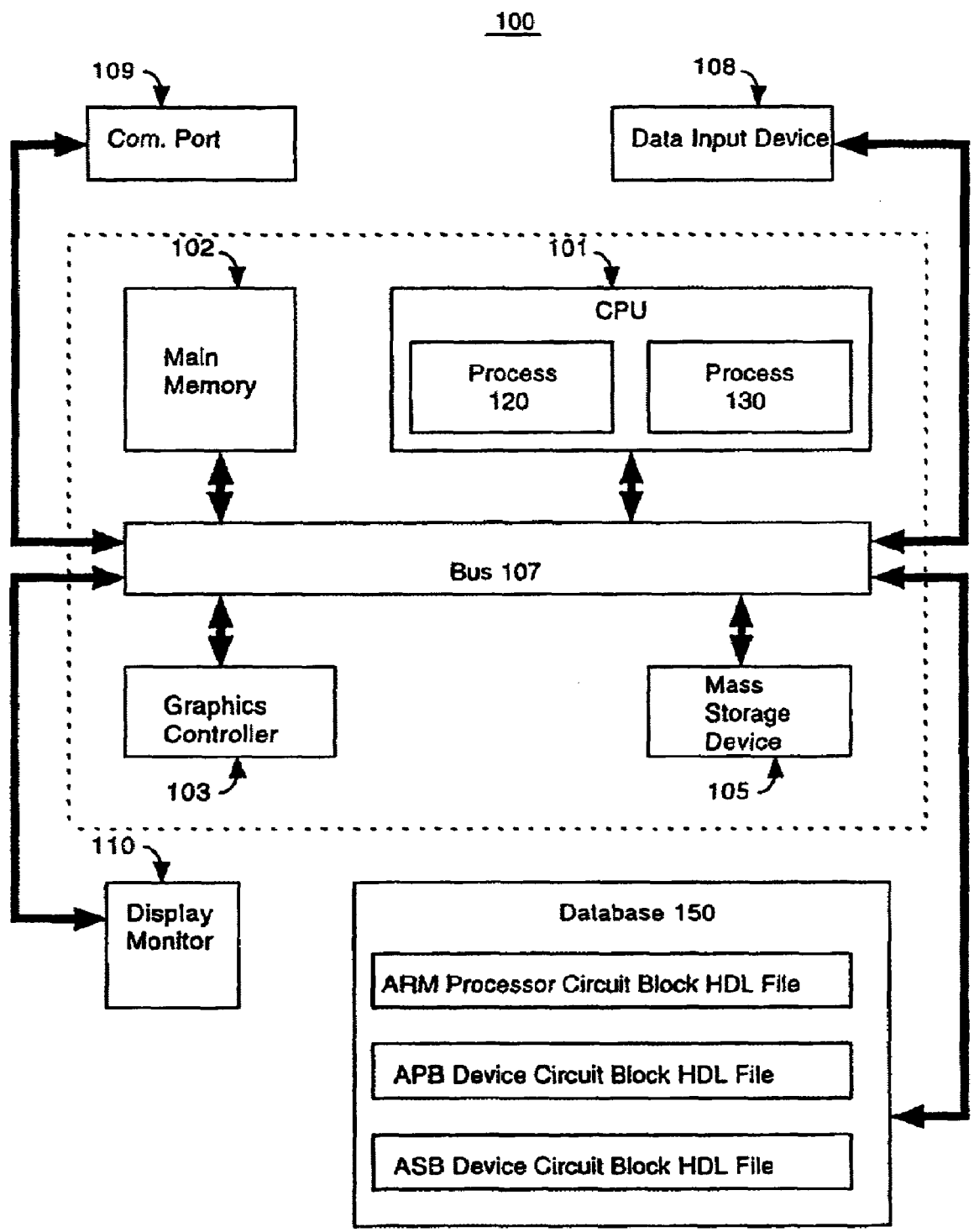
FIG. 1 is a block diagram of one embodiment of an SoC netlist builder and verification computer system of the present invention.

Reference will now be made in detail to the preferred embodiments of the invention, an IC netlist building system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention permits a designer to efficiently and effectively create and modify system on a chip (SoC) designs. The system and method of the present invention facilitates SoC design and verification by providing significant automation of a number of operations including circuit block integration, parameter assignment, addition of architecture features, verification testing and production test support. The present system and method enables a user to convey information conveniently in a manner that minimizes the amount of data a user has to enter manually while adequately describing features of the circuit being designed or analyzed. The present invention also includes automated expert system features that facilitate SoC design and testing. The expert system features facilitates the automated provision of design features based upon prior experience associated with actual SoC hardware manufacturing. It allows a user to easily create and modify design features with reduced manual data entry associated with creating netlist files and performing verification functions. The present invention facilitates the automated creation of netlist description files and logical verification environments including chip models and system level models for testing operations.

FIG. 1 is a block diagram of SoC netlist builder and verification computer system 100, one embodiment of the present invention. In general, computer system 100 comprises a central processing unit (CPU) 101, a main memory 102, graphics controller 103, mass storage device 105, input/output (IO) device 108, communication port 109, database 150 and display monitor 110, all of which are coupled to bus 107. CPU 101 handles most of the control and data processing, including processes associated with automatic generation of an IC netlist and verification models in accordance with instructions included in an SoC netlist builder and verification program of the present invention. Main memory 102 provides a convenient means for storing data for quick retrieval by CPU 101. Graphics controller 103 processes image data in pipelined stages. Mass storage device 105 is a computer readable medium that stores data associated with multiple images and applications, including information utilized by an SoC netlist builder and verification system of the present invention. IO device 108 operates as an input or output device (e.g., a keyboard, mouse, voice recognition microphone, etc.). Communication port 109 provides a communication port for a variety of devices. In one exemplary implementation of the present invention, communications port 109 provides a communication port to a network (e.g., the Internet) of devices (not shown). Display monitor 110 displays graphical images including convenient and user friendly graphical user interfaces (GUIs) to facilitate circuit block selection and parameterization. Database 150 stores information arranged in files, including data comprising circuit block description files, associated parameters and expert system prior SoC manufacturing information. Bus 107 provides a communication path between components of computer system 100.

Figure 2:
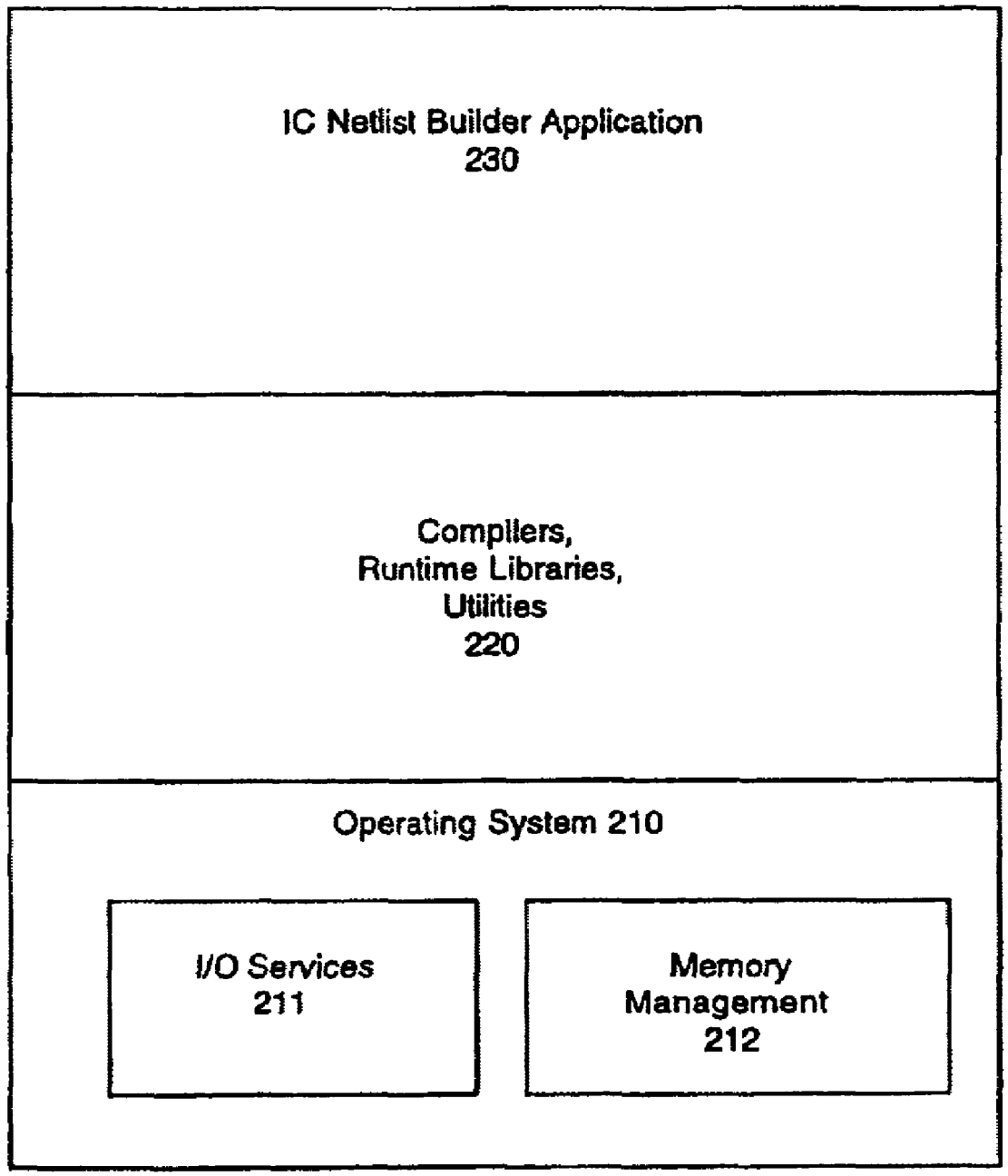
FIG. 2 is a block diagram illustrating a logical view of one embodiment of the software computer program elements of a present invention SoC netlist builder and verification computer system.

FIG. 2 is a block diagram illustrating a logical view of one embodiment of the software computer program elements of SoC netlist builder and verification computer system 100. An operating system 210 (e.g., DOS, UNIX, etc.) provides various system services to other programs executing on the computer system. In one exemplary embodiment, operating system 210 includes input/output (I/O) services 211 and memory management service 212. I/O services 211 facilitate access to I/O devices. Memory management service 212 provides management of allocation and deallocation of memory in SoC netlist builder and verification computer system 100, including virtual memory addressing or static memory addressing. Also shown are programming language compilers, software tool/utilities and their runtime libraries included in block 220 for application execution. SoC netlist builder and verification program 230 is an application running on SoC netlist builder and verification computer system 100 and utilizes the other system services (e.g., operating system 210). SoC netlist builder and verification program 230 comprises processing procedures performed by SoC netlist builder and verification computer system 100. The different levels of programming shown in FIG. 2 typically reside on a computer readable memory (e.g., a main memory 102, mass storage device 105, database 150, etc.) and include instructions for CPU 101.

Figure 3:
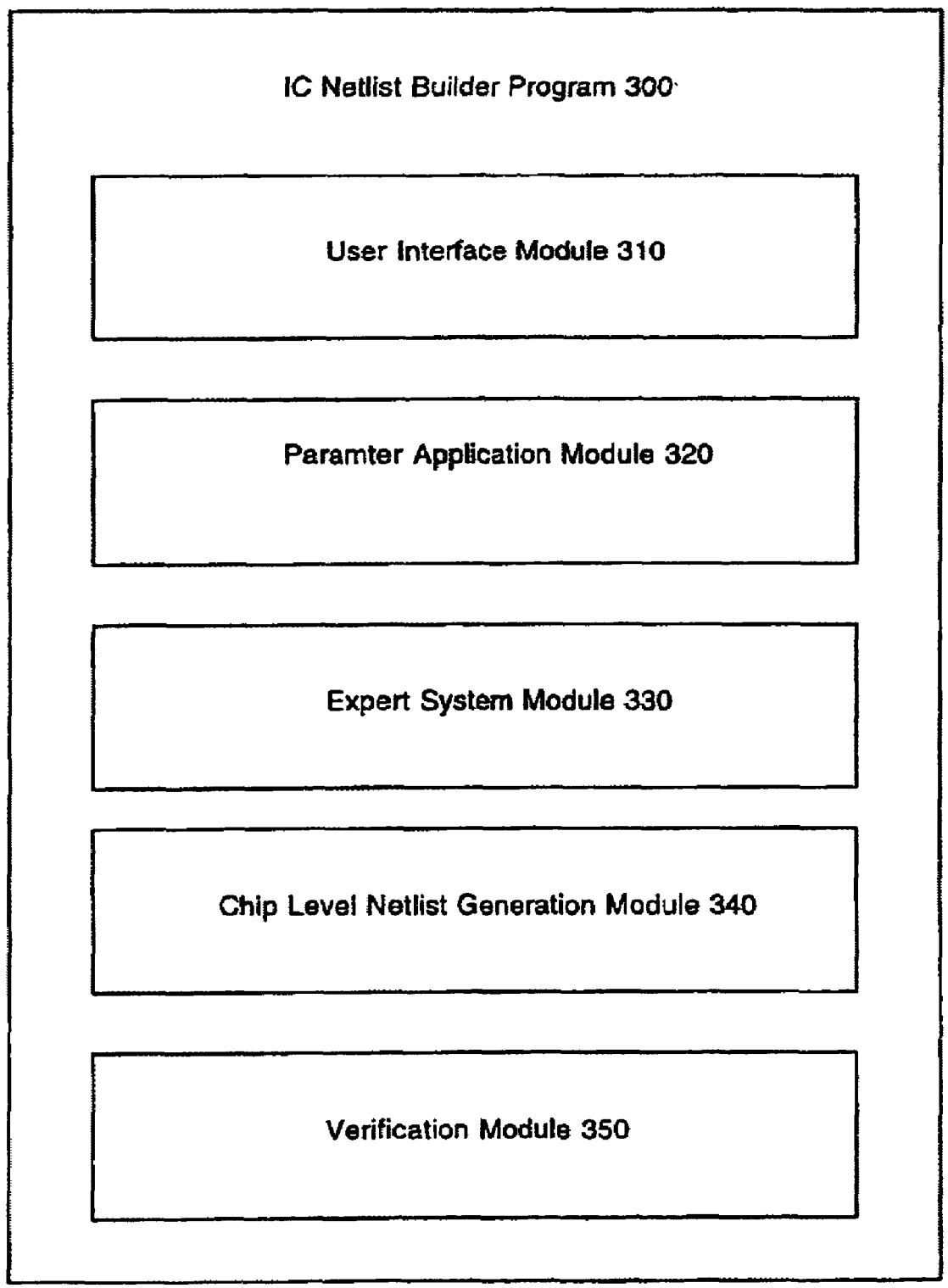
FIG. 3 is a block diagram illustrating SoC netlist builder and verification program, one embodiment of an SoC netlist builder and verification program included in an SoC netlist builder and verification computer system of the present invention.

FIG. 3 is a block diagram illustrating SoC netlist builder and verification program 300, one embodiment of a SoC netlist builder and verification program included in SoC netlist builder and verification computer system 100. SoC netlist builder and verification program 300 comprises user interface module 310, parameter application module 320, expert system module 330, chip level netlist generation module 340 and verification module 350. User module 310 provides user friendly and convenient interfaces that facilitate easy entry and modification of user selections and parameters. Parameter application module 320 interprets information supplied by user module 310 and expert system module 330 and creates directions (e.g., command lines) passed to other modules for execution. Expert system module 330 analyzes information and automatically provides SoC building and verification data including automated addition of default architectural features, automated insertion of default parameters, and automated input of information to verification module 350. Chip level netlist generation module 340 automatically generates a chip level netlist, including the instantiation of internal IC devices and connections between the circuit blocks for internal signals. Verification module 350 automatically generates a test bench and a logical verification environment including simulation models (e.g., a chip model and a system level model).

In one embodiment of the present invention, SoC netlist builder and verification program 300 also includes a synthesis module (not shown). The synthesis module automatically translates design description from a textual level abstraction to a structural level (e.g., a schematic of logic gates and electronic circuits). In one exemplary implementation of the present invention, the synthesis module also perform optimization of the design (e.g., technology specific transformations to make area/speed trade-offs necessary to meet design goals).

Generating SoC netlist files and verification information (e.g. a standardized directory structure for IC designs, a test bench, simulation models, tests, etc.) is an iterative process involving automated functions performed by a present invention SoC netlist builder and verification computer system with facilitated inputs from a user. Based upon a high level configuration indication provided by a user, a SoC netlist builder and verification computer system expert system retrieves appropriate design and test verification information from other sources such as a database library or information folders. The SoC netlist builder and verification computer system then processes the information and generates a detailed description of a circuit and appropriate verification information for the circuit. There are points in the process at which a user has opportunities to provide additional information or modify the information assembled and arranged by a present invention SoC netlist builder and verification computer system. When a user is satisfied that appropriate information has been incorporated to perform a design analysis, present invention SoC netlist builder and verification computer system automatically generates a netlist and verification test benches.

Referring to FIG. 3, user interface module 310 enables a user to communicate expediently and efficiently with a present invention SoC netlist builder and verification computer system. In one embodiment of the present invention, user interface module 310 comprises software code that instructs SoC netlist builder and verification computer system 100 to generate an interactive graphical user interface (GUI). The GUI presents information regarding operations of SoC netlist builder and verification computer system 100 to the user. User interface module 310 conveys information between a user and other components of SoC netlist builder and verification computer system 100 in a convenient format that is easier to read and modify relative to a complex simulation tool formatted input text. In one embodiment of a present invention, a user interface module generates user friendly GUIs to facilitate selection of standardized circuit blocks and parameterization of the selected circuit blocks. In another embodiment, user interface module 310 interprets batch code text rather than relying on GUI input.

Parameter application module 320 provides instructions for the SoC netlist builder and verification computer system to retrieve block descriptions and assign parameters based upon input from user interface module 310 and expert system module 330. In one embodiment of the present invention, parameter application module 320 performs initialization of circuit block characteristics (e.g., device characteristics), updates circuit block characteristics, creates design lists and retrieves circuit block descriptions. The following table 1 includes pseudo code utilized in one exemplary implementation of a present invention computer instruction parameter application module.

TABLE 1

```
process_device( )
{
    if ( number_of_devices > 0 )
    {
        initialize_hdli_design_parameter_list ( );
        for (device_number in 1to number_of_devices)
        {
            make_hdli_design_parameter_list_copy ( );
            initialize_device_gate_count ( );
            initialize_device_port_interface ( );
            initialize_device_signal_requirements ( );
            initialize_device_external_pin_interface ( );
            initialize_device_signal_initialization ( );
            /* Device options are specified by the user either via
               the GUI or by loading a configuration file */
            for (device_option from 1 to number_of_device_options)
            {
                /* Based on the device option update the following */
                update_hdli_design_parameter_list_copy ( );
                update_device_gate_count ( );
                update_device_port_interface_list ( );
                update_device_external_pin_interface ( );
                update_device_signal_requirements ( );
                update_device_signal_initialization ( );
                update_interrupt_source_list ( );
            }
            add_device_to_device_list ( );
            add_device_to_reset_destination_list ( );
            add_device_to_clock_destination_list ( );
            add_device_gate_count_to_gate_count_list ( );
            add_device_port_interface_to_port_interface_list ( );
add_device_external_pin_interface_to_external_pin_interface_list ( );
            add_device_signal_requirements_to_signal_requirements_list
( );
            add_device_signal_initialization_to_signal_initialization_list ( );
            /* Call HDLi with the device parameter list */
            create_directory_structure_for_device ( );
            create_hdli_block_using_design_parameter_list_copy ( );
        }
    }
}
```

Parameter application module 320 is flexibly adaptable to a variety of implementations and applicable to a number of functions including creating an underlying structure list, initializing a command line string, updating a copy of the command line string with parameters, generating an internal circuit block integration list, and extracting circuit block descriptions from a storage location based upon the applied parameter information.

In one embodiment of the present invention, parameter application module 320 creates an underlying structure list based upon information supplied by a user via user interface module 310 and information provided by expert system module 330. In creating the underlying structure list, the parameter application module 320 interprets the user-entered information and commands and performs the required iterations. In one embodiment of the present invention, parameter application module 320 initializes a corresponding command line string for a circuit block descriptions (e.g., a timer description) forwarded by expert system module 330. For example, a parameterizable command line string required to generate the selected block circuit (e.g., a timer) from a hardware description language (e.g., reuse library) is initialized and the operations for each block circuit (e.g., a timer) the user has requested are processed. Parameter application module 320 then makes an instance specific copy of the parameterizable command line sting. FIG. 4A is a table comprising one exemplary implementation of parameter application module 320 instructions for directing SoC netlist builder and verification computer system 100 to perform these design functions associated with the inclusion of a timer device in a desired design.

Parameter application module 320 (shown in FIG. 3) then directs a SoC netlist builder and verification computer system to update the specific copy of the parameterizable command line string with the actual user indicated parameters received from user interface module 310 and expert system module 330 for that particular instance. FIG. 4B is a table comprising one exemplary implementation of instructions for directing SoC netlist builder and verification computer system 100 to perform an update of a specific copy of a parameterizable command line string associated with a timer. Parameter application module 320 then appends the circuit block attributes to other files. In one exemplary implementation, a circuit block (e.g., a clock) directory is appended to a list of libraries and also appended to a list of categorized devices (e.g., APB devices). In one embodiment of the present invention, the gate count of a circuit block is added to the list of gate counts for the IC. FIG. 4C is a table comprising one exemplary implementation of instructions for directing an SoC netlist builder and verification computer system of the present invention to append these design functions associated with a timer.

Referring again to FIG. 3, parameter application module 320 then generates an internal integration list associated with the circuit block. The internal integration list is utilized in the processing of other routines included in an SoC netlist builder and verification computer system of the present invention. In one exemplary implementation, an internal integration list includes internal signal definitions (e.g., sgn1_name), clocks the device is coupled to (e.g., clk_dst_name), any assignments or initializations performed for proper circuit operation (e.g., assign_list), how the device is instantiated and connected in the chip level netlist (e.g., info), interrupts the device is coupled to (e.g., intr_src), and resets the device is coupled to (e.g., rst_dst_name). The generation of these lists is based on the user parameterization of the device in the user interface module and parameters automatically provided by the expert system module 330. FIG. 5 is a table comprising one exemplary implementation of instructions for directing an SoC netlist builder and verification computer system of the present invention to perform the generation of an internal integration list associated with a timer device.

Parameter application module 320 (see FIG. 3) also provides the SoC netlist builder and verification computer system with instructions on the extraction of circuit block descriptions from a storage location based upon the parameterized information. In one embodiment of the present invention, an SoC netlist builder and verification computer system includes a hardware data base comprising parameterizable circuit block descriptions and a circuit block description (e.g., a timer description) is extracted utilizing a parameterized command line string. In one embodiment of the present invention, the circuit block information is extracted from a database comprising circuit block descriptions of previously utilized and tested circuit blocks (e.g., verified in silicon).

One exemplary implementation of instructions for directing a SoC netlist builder and verification computer system to perform the extraction comprises the following directions:

```
gen_hdli_block $ :: CHIP_DSGN_DIR $ {Devicename}
   $DSGN_PARAM_COPY
      incr I
   }
``` where CHIP_DSGN_DIR is a physical directory in which the HDL for the device is stored and the DSGN_PARAM_COPY is the command line string of the parameters for the block. In one embodiment of the present invention, extraction module 330 provides hooks and handles to facilitate the inclusion of circuit block descriptions custom designed by a user for a specific application. In one embodiment of the present invention, a user provides user interface module 310 with information regarding the storage location of description files for custom designed circuit blocks and SoC netlist builder and verification system 100 incorporates them in the design.

Referring still to FIG. 3, expert system module 330 facilitates SoC netlist construction and verification. Expert system module 330 instructions for the automatic provision of numerous circuit block descriptions included in a SoC based upon a given architecture or configuration specified by a user via user module 310. Expert system module 330 utilizes extensive information associated with a given architecture and expert system algorithms that apply probabilities associated with certain features of a SoC to determine circuit block descriptions and parameters included in a design. The expert system module 330 relieves a user from performing certain tasks including cognitively recalling circuit block descriptions, expending intellectual ingenuity to develop circuit block designs, and manually entering input data associated with the circuit block descriptions.

In one embodiment of the present invention, expert system module 330 retrieves the circuit block descriptions and parameter information from an expert system data base. The expert system data base includes information associated with previous experience building a SoC that is used by SoC netlist builder and verification computer system 100 to determine the circuit block descriptions included in the configuration and to provide parameters associated with the circuit block descriptions. For example, expert system module 330 includes programming instructions derived from extensive experience associated with actually building a wide variety of SoC implementations. Expert system 330 continues to automatically provide iterative updates of revised circuit block descriptions and parameters based upon further user input. In one embodiment of the present invention, a user is not required to enter all the parameters manually, expert system module 330 provides numerous parameter definitions in accordance with data base information derived from numerous previous design applications.

In one exemplary implementation of the present invention, expert system 330 retrieves circuit block descriptions and parameters associated with a reduced instruction set computer (RISC) included in an advanced RISC machine (ARM) architecture. Expert system module 330 automatically retrieves a variety of circuit block descriptions and parameters associated with an ARM architecture system. For example, expert system 330 retrieves circuit block descriptions of an ARM processor capable of performing the requisite functions, an advanced system bus (ASB) circuit block description, an ASB arbiter circuit block description, a memory circuit block description, a static device controller (SDC) circuit block description, clock logic circuit block descriptions and external ASIC input/output circuit block descriptions. Expert system module 330 also automatically assigns parameters to the ARM circuit block descriptions.

Referring again to FIG. 3, chip level netlist generation module 340 creates an IC core level netlist based on data structures that were populated in other routines of an SoC netlist builder and verification computer system and method of the present invention. Chip level netlist generation module 340 creates a netlist file in the desired location. In one embodiment of the present invention, chip level netlist generation module 340 creates the hardware description language (e.g., VHDL or Verilog) code that provides instructions for automatic performance of coupling circuit block descriptions together. The following table 2 includes pseudo code utilized in one exemplary implementation of a present invention computer instruction parameter application module.

TABLE 2

```
create_chipcore( )
{
    open hdl_file_for_writing ( );
    /* Padring Compiler will create the top level with the pads and the
        core instantiated based on the external pin interface list */
    invoke_padring_compiler_using_external_pin_interface_list ( );
    /* Create chip core module/entity section */
    generate_hdl_specific_chipcore_module_declaration ( );
    /* Create the signal declarations */
    for (signal_name in signal_requirements_list)
    {
        if (signal_width == 1)
            print_hdl_specific_signal_declaration ( );
        else
            print_hdl_specific_bussed_signal_declaration ( );
    }
    for (reset_name in reset_destination_list and clock_destination_list)
    {
        print_hdl_specific_bussed_signal_declaration ( );
    }
    /* Create the signal initializations */
    for (signal_name in signal_initialization_list)
    {
        print_hdl_specific_signal)initialization( );
    }
```

TABLE 2-continued

```
    /* Instantiate all the devices in the chip core */
    for (device in device_list)
    {
        print_hdl_specific_device_instantiation_statement ( );
        for (port_element in device_port_interface)
        {
            print hdl_specific_port_mapping ( );
        }
    }
    /* Instantiate the reset and clock modules */
    generate_reset_module_based_on_reset_destination_list ( );
    instantiate_reset_module ( );
    generate_clock_module_based_on_clock_destination_list ( );
    instantiate_clock_module ( );
    /* Based on the user options for external pin multiplexing
        create the required logic */
    create_pin_multiplexing_module ( );
    instantiate_pin_multiplexing_module ( );
    /* Based on the power management requirements create the
        power management logic */
    create_power_management_module ( );
    instantiate_power_management_module ( );
    print_hdl_specific_module_terminator ( );
}
```

Core netlist generation module 340 is flexibly adaptable to a variety of implementations.

In one exemplary implementation of the present invention, the VHDL or Verilog code is based upon a signal name list (e.g., sgnl_name list) comprising the internal signals that are generated to achieve proper connectivity. FIG. 6A is a table comprising one exemplary implementation of instructions for directing SoC netlist builder and verification computer system 100 to perform the creation of the actual hardware description language VHDL or Verilog code utilized in creating a netlist description of a timer device and storing the netlist description in a desired memory location.

In one embodiment of the present invention, chip level netlist generation module 340 performs signal declarations. Chip level netlist generation module 340 generates required HDL assign statements in accordance with an assignment list (e.g., assign_list) and an instantiation list (e.g., inst_list). FIG. 6B is a table comprising one exemplary implementation of instructions for directing an SoC netlist builder and verification computer system of the present invention to perform the creation of the signal declarations. FIG. 6C is a table comprising one exemplary implementation of instructions for directing an SoC netlist builder and verification computer system to generate HDL assignment statements. Chip level netlist generation module 340 provides instructions on the generation of the HDL code that instantiated each of the components. In one embodiment of the present invention, an instantiation list includes directions on the way each of the devices should be instantiated and connected. FIG. 7 is a table comprising one exemplary implementation of instructions for directing a SoC netlist builder and verification computer system to perform the generation of the HDL code that instantiates each of the components.

In one embodiment of the present invention, verification module 350 automatically provides test bench stimuli information used to verify the functionality of a design. The verification module 350 automatically creates a declaration of a device under test (DUT) including a definition of the internal signals, a component declaration of the DUT with constant definitions (e.g., a clock period duration), values for DUT input ports, and models of external components for functional environmental testing. The following table 3 includes pseudo code utilized in one exemplary implementation of a present invention computer instruction parameter application module.

TABLE 3

```
create_testbench ( )
{
    open_testbench_for_writing ( );
    create_signal_declaration_based_on_external_port_interface ( );
    instantiate_chipcore ( );
    for (device in device_list)
        {
            if ( responder_model_for_device_exists ( ) )
            {
                instantiate_responder_model ( );
            }
            if ( parameterized_test_code_for_device_exists ( ) )
            {
                /* Using the parameterized test code and the device
                    options, generate the device specific test code */
generate_device_specific_test_code_based_one_device_options ( );
            }
        }
    instantiate_internal_bus_monitors ( );
}
```

The present invention facilitates the automated creation of logical verification environments including chip models and system level models for testing operations.

In one embodiment of the present invention, a user interface module (e.g., user interface module 310) includes an initial GUI that is presented to a user when an SoC netlist builder and verification application or program is initiated (e.g., booted up). The initial GUI requests the user to enter some high level architectural information. In one exemplary implementation the user enters information regarding the general processing environment (e.g., pentium, ARM, etc.) or primary buses (e.g., PCI, ASB, etc.). Depending upon the information entered in the initial GUI, the present invention SoC netlist builder and verification system and method presents the user with an SoC netlist builder and verification main GUI. The display presented by the SoC netlist builder and verification main GUI is based upon information provided by an expert system module (e.g., expert system module 330). The expert system module retrieves information from previous manufacturing and verification operations associated with similar designs for presentation to the user via the main GUI. Presenting the user with this information facilitates the reduction of manual data entry and provides expertise information from prior manufacturing operations.

Figure 8:
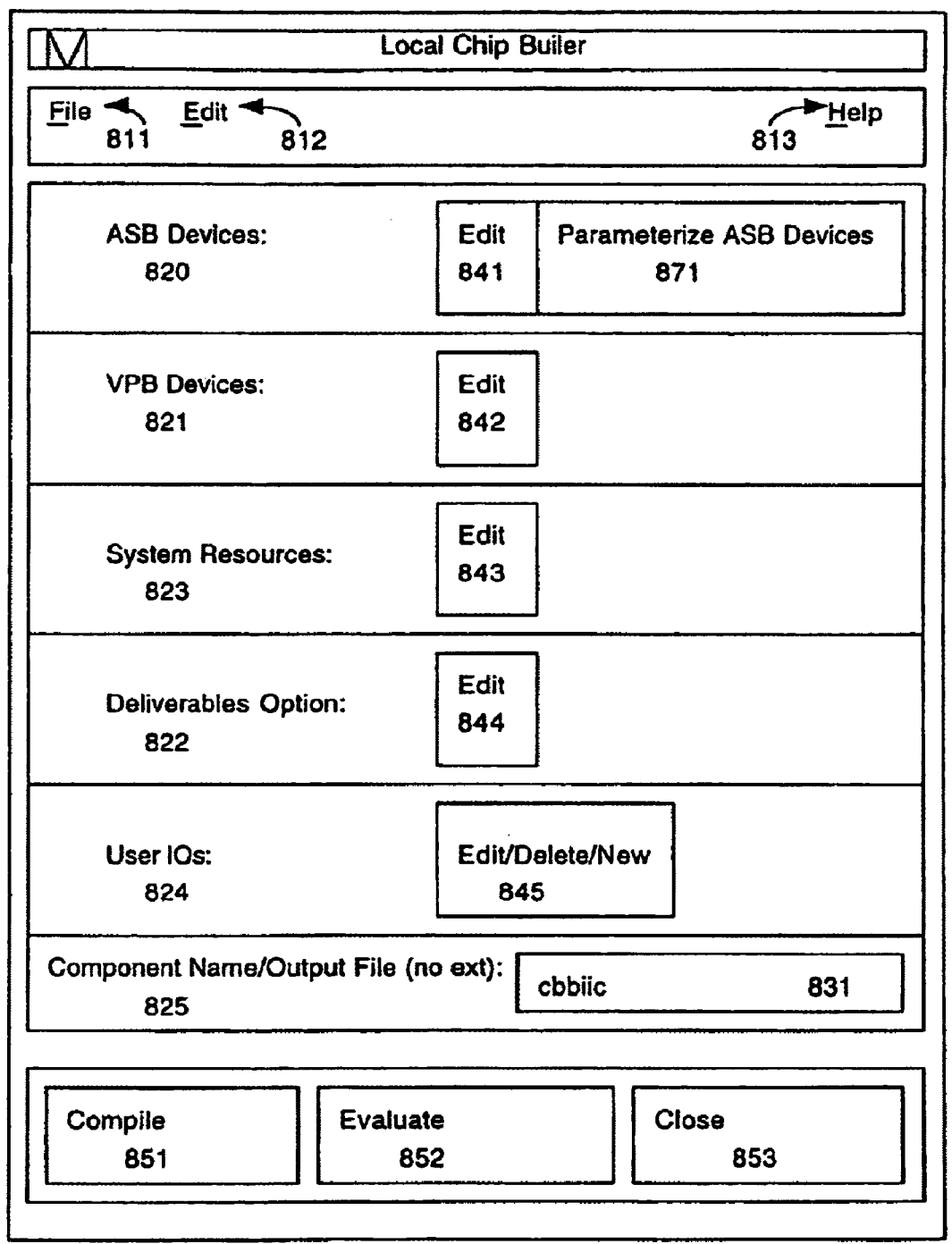
FIG. 8 illustrates one embodiment of a present invention SoC netlist builder and verification main GUI.

In one embodiment of the present invention, an SoC netlist builder and verification system and method utilizes the SoC netlist builder and verification main GUI as an initial GUI when the application is initiated. The SoC netlist builder and verification main GUI comprises several sections identifying relatively high level descriptions of devices and characteristics of an architecture provided by an expert system module based upon a high level configuration indication provided by the user in the initial GUI. A user indicates if they wish to select or modify devices or characteristics included in a particular high level description section (e.g., a user click on an edit button in a ASB device section). After users confirm they are satisfied with the configuration, circuit blocks and parameters supplied by the expert system module, the user instructs the SoC netlist builder and verification system and method to perform compile operations and evaluation operations. The SoC netlist builder and verification system and method automatically develops a SoC netlist description of the desired SoC, a FIG. 8 illustrates SoC netlist builder and verification main GUI 800, one embodiment of a present invention GUI. The GUI is presented to a user in a dialogue box format utilizing a main GUI 800 comprising control buttons, SoC builder sections, tabs and dialogue boxes. The control buttons of main GUI 800 comprise file dropdown button 811, edit dropdown button 812, help dropdown button 813, compile button 851, evaluate button 852 and close button 853. The tabs of SoC netlist builder and verification main GUI 800 comprises edit buttons 841 through 845. The SoC builder sections available in one embodiment of SoC netlist builder and verification main GUI 800 comprise general categories provided by an expert system module, including ASB devices 820, APB Devices 821, System Resources 822, Deliverables Options 823, User IOs, 824 and Component Name/Output File 825. The control buttons permit a user to direct commands from the GUI to other parts of the computer system, and the tabs permit a user to access subwindows by clicking (e.g. with a cursor directing device) on a different tab to move between subwindows. In one embodiment a popup box or help balloon appears to provide further options with respect to the edit tab. In one exemplary implementation, a help balloon 871 comprising the text "parameterize ASB devices" appears when a cursor points at edit tab 841.

Figure 9:
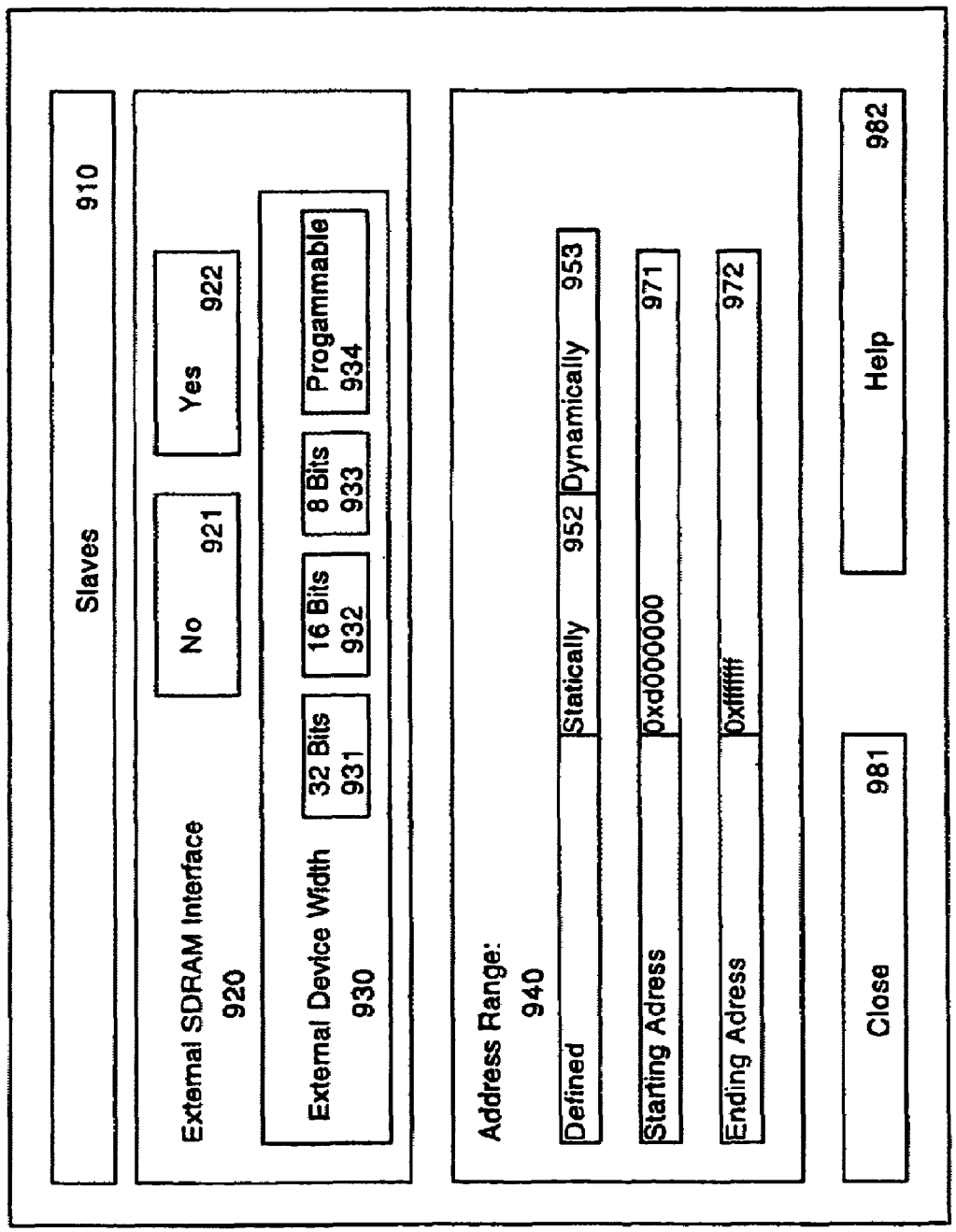
FIG. 9 is an illustration of SoC netlist builder and verification device GUI 900 included in one embodiment of the present invention.

FIG. 9 is an illustration of SoC netlist builder and verification device GUI 900 included in one embodiment of the present invention. In one exemplary implementation, an SoC netlist builder and verification device GUI 900 facilitates user input associated with an external SoC interface design (e.g., for an external SDRAM device) for an ASB device. SoC netlist builder and verification ASB device GUI 900 comprises descriptions and parameters supplied by an expert system module, including external SDRAM Interface selection section 920 and address range selection section 940. External SDRAM Interface selection section 920 and address range selection section 940 comprise features supplied by an expert system module. The automatically provided features are based upon extensive experience in design, manufacture and testing of a SoC interface design for an external SDRAM device. External SDRAM Interface selection section 920 enables a user to select whether a design includes an external SDRAM interface and the width of the external SDRAM interface. Address range section 940 enables a user to define if a selected SDRAM interface services a static or dynamic device and a starting and ending address of the external SDRAM device.

Figure 10:
FIG. 10 is an illustration of an advanced peripheral bus (APB) GUI included in one exemplary implementation of the present invention.

One embodiment of the present invention includes GUIs with predefined content supplied by an expert system module and organized to facilitate user input (e.g., architecture configuration, parameter selections, etc.). FIG. 10 is an illustration of advanced peripheral bus (APB) GUI 1000 included in one exemplary implementation of the present invention. Advanced peripheral bus (APB) GUI 1000 comprises a list of APB device sections in easy to use format to facilitate user selection. The list of APB devices are automatically identified by a present invention expert system module as devices included in an APB system, including input/output circuit blocks, controller circuit blocks, clock circuit blocks, memory circuit blocks, interface circuit blocks and configuration circuit blocks.

In one exemplary implementation, advanced peripheral bus (APB) GUI 1000 comprises APB based Watchdog Timer Parameters Section 1010, APB Based Timer Parameters Section 1011, APB Based UART/IrDA Parameters Section 1012, APB Based I2C Parameters Section 1013, APB Based USB Device Parameters Section 1014, APB Based GPIO Parameters Section 1015, APB Based RTC Parameters Section 1016, APB Based BBRAM Parameters Section 1017, APB Based Interrupt Controller Parameters Section 1018, Security Blocks Section 1019, User Defined Config Register Groups Section 1020, and APB Based User Block Interface Parameters Section 1022. Each of the sections includes an edit button. If a user selects an edit button a device parameterization subwindow appears. One embodiment of advanced peripheral bus (APB) GUI 1000 also includes title section 1005, close button 1022 and help button 1023.

Figure 11:
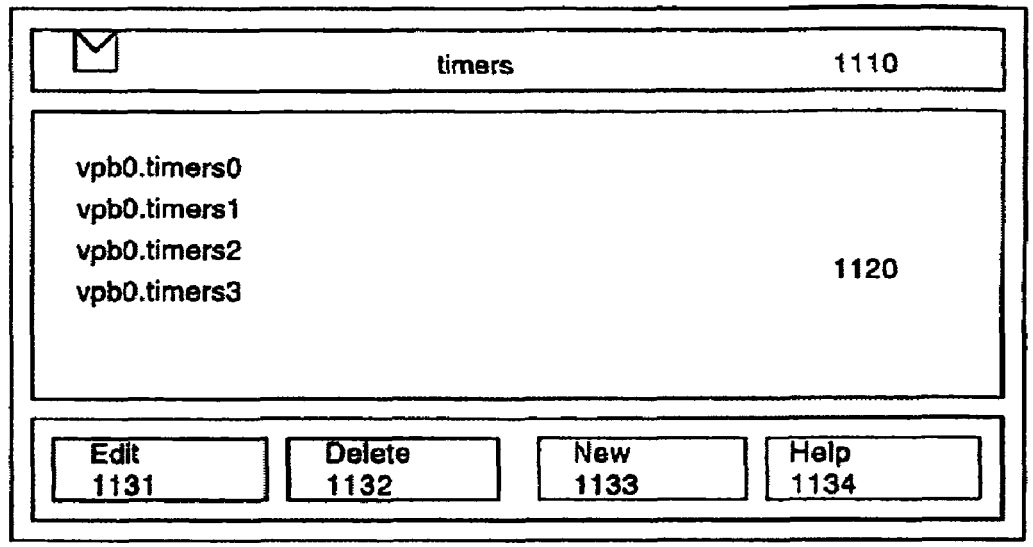
FIG. 11 is a block diagram illustration of a timer device paramaterization GUI, one embodiment of a present invention device paramaterization GUI.
Figure 12:
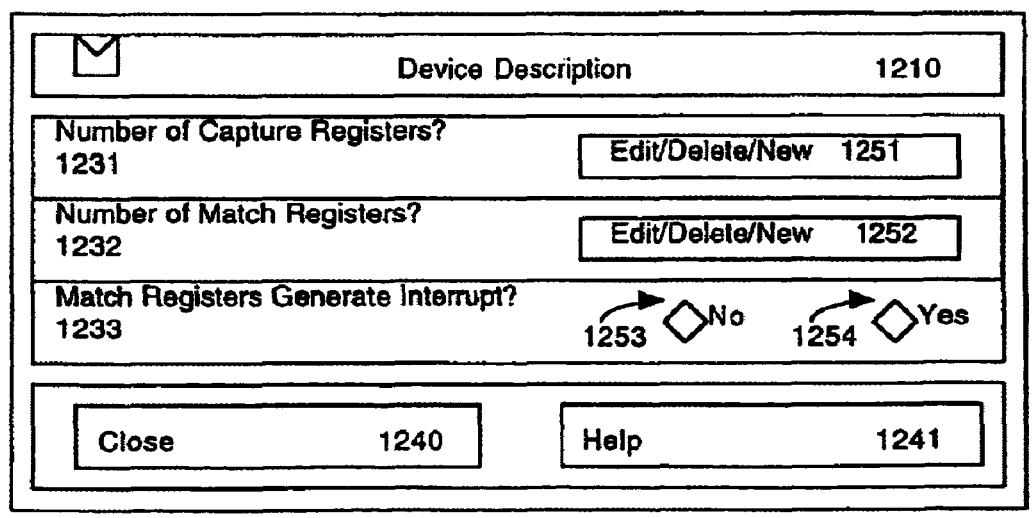
FIG. 12 is a block diagram illustration of detailed timer paramaterization GUI, one embodiment of a present invention detailed device paramaterization GUI.

In one embodiment of the present invention a device parameterization subwindow includes a device paramaterization GUI. FIG. 11 is a block diagram illustration of timer device paramaterization GUI 1100, one embodiment of a present invention device paramaterization GUI. Timer device paramaterization GUI 1100 comprises title section 1110, timer device identification section 1120, edit button 1131, delete button 1132, new button 1133 and help button 1132. Timer device identification section 1120 comprises an identification of possible timers included in a design. Delete button 1132 permits a user to delete a timer and new button 1133 permits a user to add a new timer. If a user clicks on edit button 1131 a detailed device paramaterization GUI is presented to the user. FIG. 12 is a block diagram illustration of detailed timer paramaterization GUI 1200, one embodiment of a present invention detailed device paramaterization GUI. Detailed timer paramaterization GUI 1200 comprises title section 1210, number of capture registers section 1231, number of match registers section, match registers generate interrupt section 1233, close button 1240 and help button 1241. A user clicks on edit button 1251 to change the number of capture registers and edit button 1252 to change the number of match registers 1232. A user clicks on No button 1253 or Yes button 1254 to indicate if a match register generates and interrupt.

In one embodiment of the present invention a SoC netlist builder and verification computer system and method includes an external pin GUI. An external pin GUI facilitates user input of information associated with an external pin. In one exemplary implementation of the present invention an external pin GUI facilitates modification of general purpose input/output (GPIO) parameterization and pin muxing features. The present invention does not perform automated design of external pin mulitplexing. The present invention does permit user definition of external pin multiplexing status.

Figure 13:
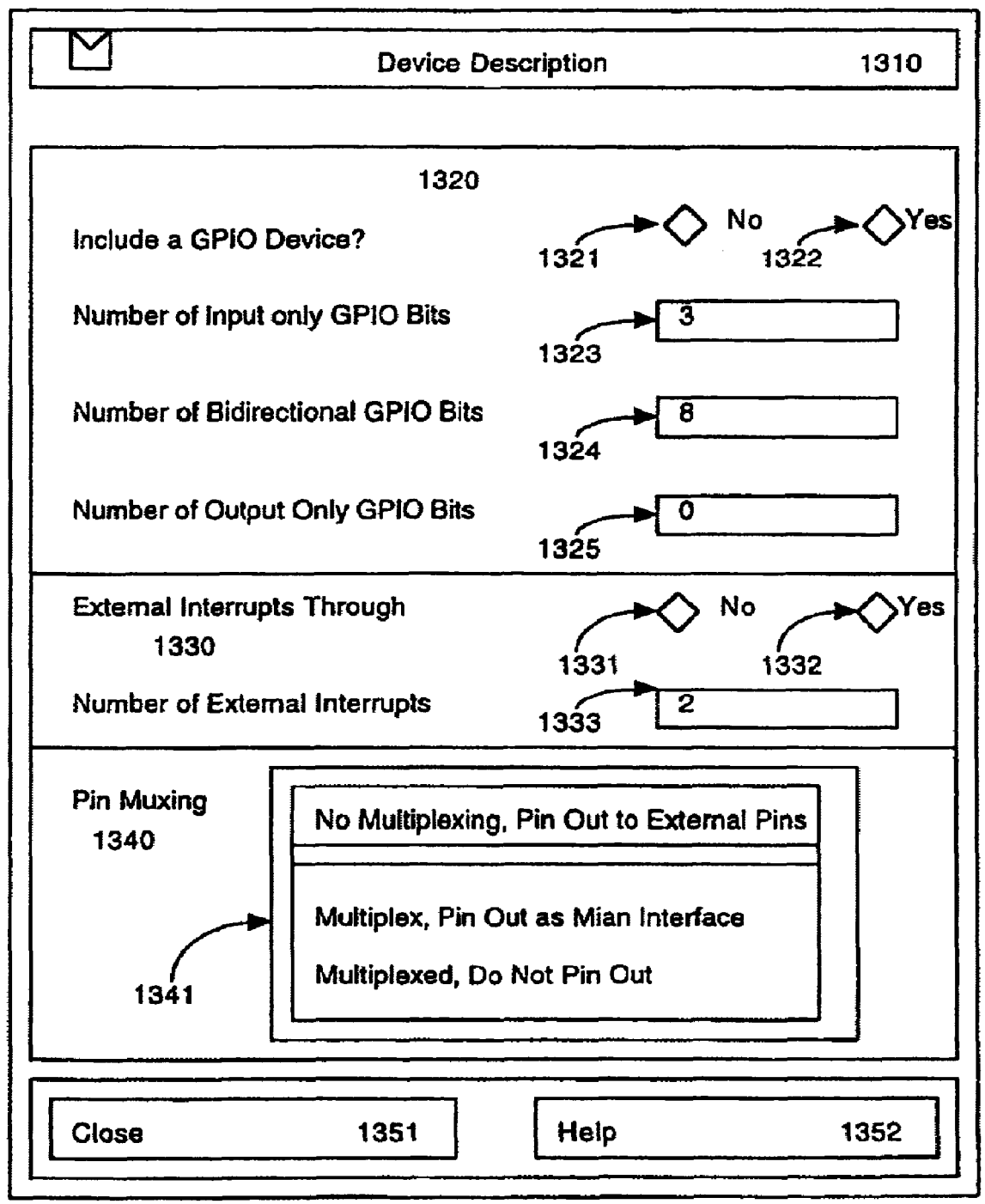
FIG. 13 is a block diagram illustration of one embodiment of an external pin GUI of the present invention.

FIG. 13 is a block diagram illustration of external pin GUI 1300. External pin GUI 1300 comprises title section 1310, GPI section 1320, external interrupt section 1330, pin muxing section 1340, close button 1351 and help button 1352. A user indicates if the design includes a GPIO device by selecting yes button 1322 and indicates it does not include a GPIO device by clicking no button 1321 of GPI section 1320. If a design includes a GPIO device the present invention external pin GUI further facilitates easy parameterization by providing dialogue box 1323 for the number of input only GPIO bits, dialogue box 1324 for the number of bi-directional GPIO bits, and dialogue box 1325 for the number of output only GPIO bits. A user indicates if a design includes an external interrupt by clicking yes button 1332 and indicates a design does not include an external interrupt by clicking no button 1331. If a design includes an external interrupt the present invention external pin GUI further facilitates easy parameterization by providing dialogue box 1333 for the number of external inputs. Pin muxing section 1340 facilities user selection of external pin muxing by offering a selection of dropdown choice of three selection in dialogue box 1341.

The preceding discussion of GUI's provided by a SoC netlist builder and verification computer system illustrates the extensive automation provided an expert system module of the present invention provides. The expert system module automatically provides a significant amount of information associated with circuit block descriptions and parameters. With each progressive delve into the design layers (e.g., from SoC netlist builder and verification main GUI 800 to SoC netlist builder and verification device GUI 900 to advanced peripheral bus (APB) GUI 1000, etc.) the SoC netlist builder and verification computer system automatically provides progressively more detailed information. The expert system module of the SoC netlist builder and verification computer system also automatically supplies a significant amount of appropriate parameters. Thus, a user is automatically prompted with a significant amount of previously designed, manufactured and verified design information in an easy to use point and click format without having to remember or expend cognitive intellectual energy developing the design details.

An SoC netlist builder and verification system and method of the present invention provides a variety of deliverables including a standardized directory structure, a simulatable chip level model, environment model, hard macros, test bench deliverables, documentation (e.g., in MIF and TXT format), and C-Shell scripts. In one exemplary implementation, the standardized directory structure includes directories for chip designs, test bench, simulation models, tests etc. A simulatable chip level model includes block level RTLs generated from a design repository, block level synthesis scripts, chip core connectivity, top level RTL for the chip, top level synthesis scripts and top level timing analysis scripts. The top level RTL for the chip includes IOs generated via a do ring compiler. Based on parameterization of IOs, a present invention SoC netlist builder and verification system and method also automatically inserts boundary scan features and a test access port (TAP) controller. Top level scripts for scan insertion and scan simulation are also generated. In one exemplary implementation of the present invention, external interfaces are pinned out and it is left to the user to perform any desired multiplexing of the interfaces.

The test bench deliverables include, a test bench based on the parameterized choice of interfaces, responder models based on the parameterization, C-code tests to test the interfaces and connectivity based on the parameterized address map, interface to a design integrator (simulation and synthesis ready), hierarchical and recursive "Makefiles" for compilation for RTL and gate level models, and scripts to help generation of new tests. The documentation includes documentation on chip IOs, parameterized feature list, parameterized address map, parameterized block diagrams, estimated gate counts, interface to a die size estimator tool, C-Shell scripts, C-shell scripts to regenerate blocks from reuse library, C-shell scripts to compile each of the blocks from the top level for simulations, "Makefiles" for compiling the entire design for simulation, and C-shell scripts to perform a bottom up synthesis for all the blocks and then for the top level to create a layout ready netlist.

Figure 14:
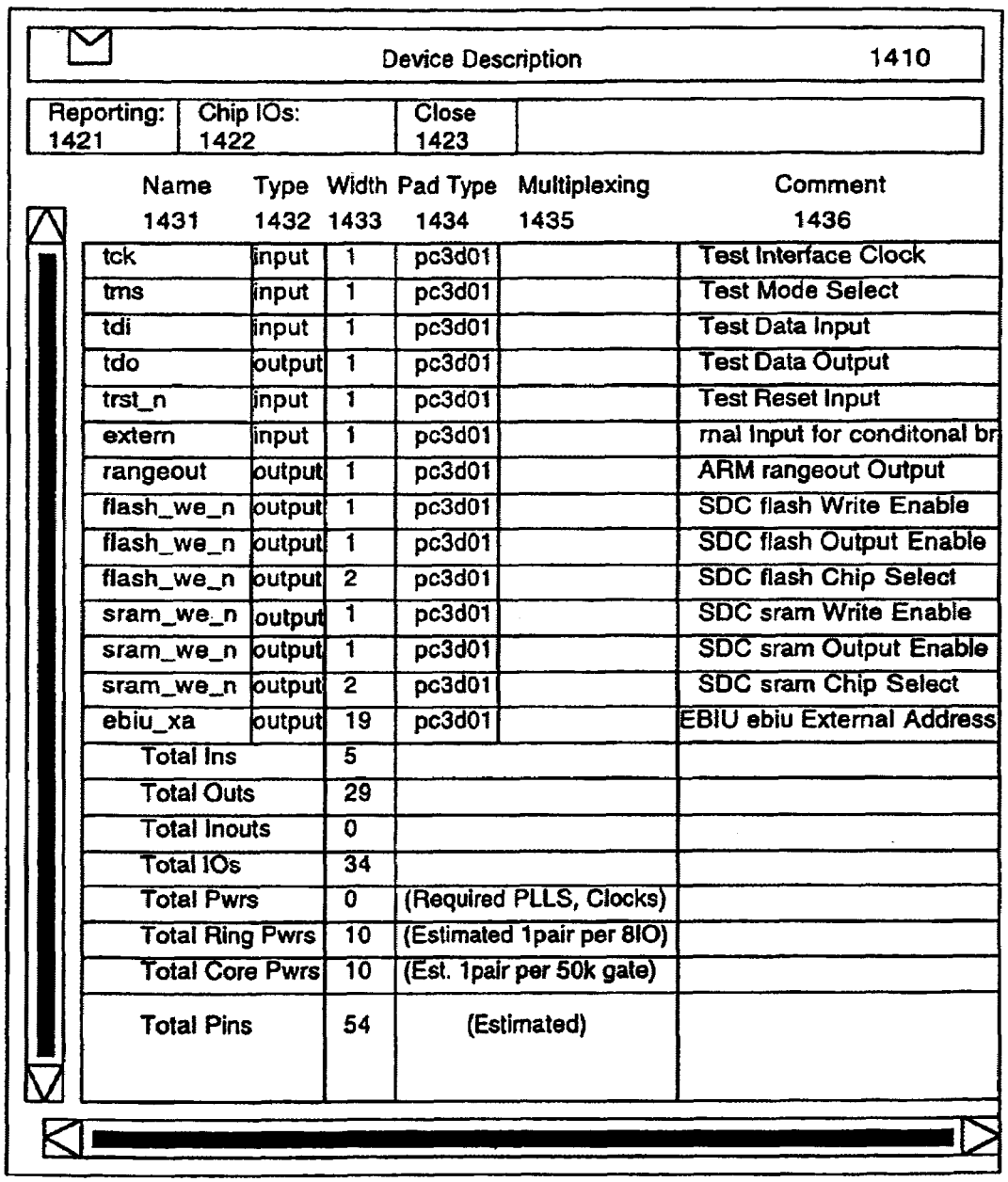
FIG. 14 is a block diagram illustration of sample input/output report produced by one embodiment of the present invention.

FIG. 14 is a block diagram illustration of sample input/output report 1400 produced by one embodiment of the present invention. Sample input/output report 1400 comprises a title section 1410, reporting section 1421, Chip IOs button 1422, Close button 1423, Name column 1431, Type Column 1432, Width Column 1434, Multiplexing Column 1435 and comment column 1436. Name column 1431 includes the identifying name of an IO. Type Column 1432 includes a description of an IO type. Width Column 1434 indicates an IO width. Multiplexing Column 1435 indicates if an IO is multiplexed. Comment column 1436 provides additional information associated with an IO. One exemplary implementation of sample input/output report 1400 includes IO summarizing information (e.g., total ins, total outs, total inouts, total IOs, total powers (pwrs), total pins, etc.). In one embodiment of the present invention, sample input/output report 1400 is exportable to MS Excel.

In one embodiment of the present invention, SoC netlist builder and verification computer system 100 generates a system architecture schematic for an IC. In one exemplary implementation SoC netlist builder and verification computer system 100 generates an advanced RISC machine (ARM) ASIC that operates in accordance with a reduced instruction set computer architecture (RISC). In one exemplary implementation, user interface module generates a GUI display of the 310 system architecture schematic for an IC.

Figure 15:
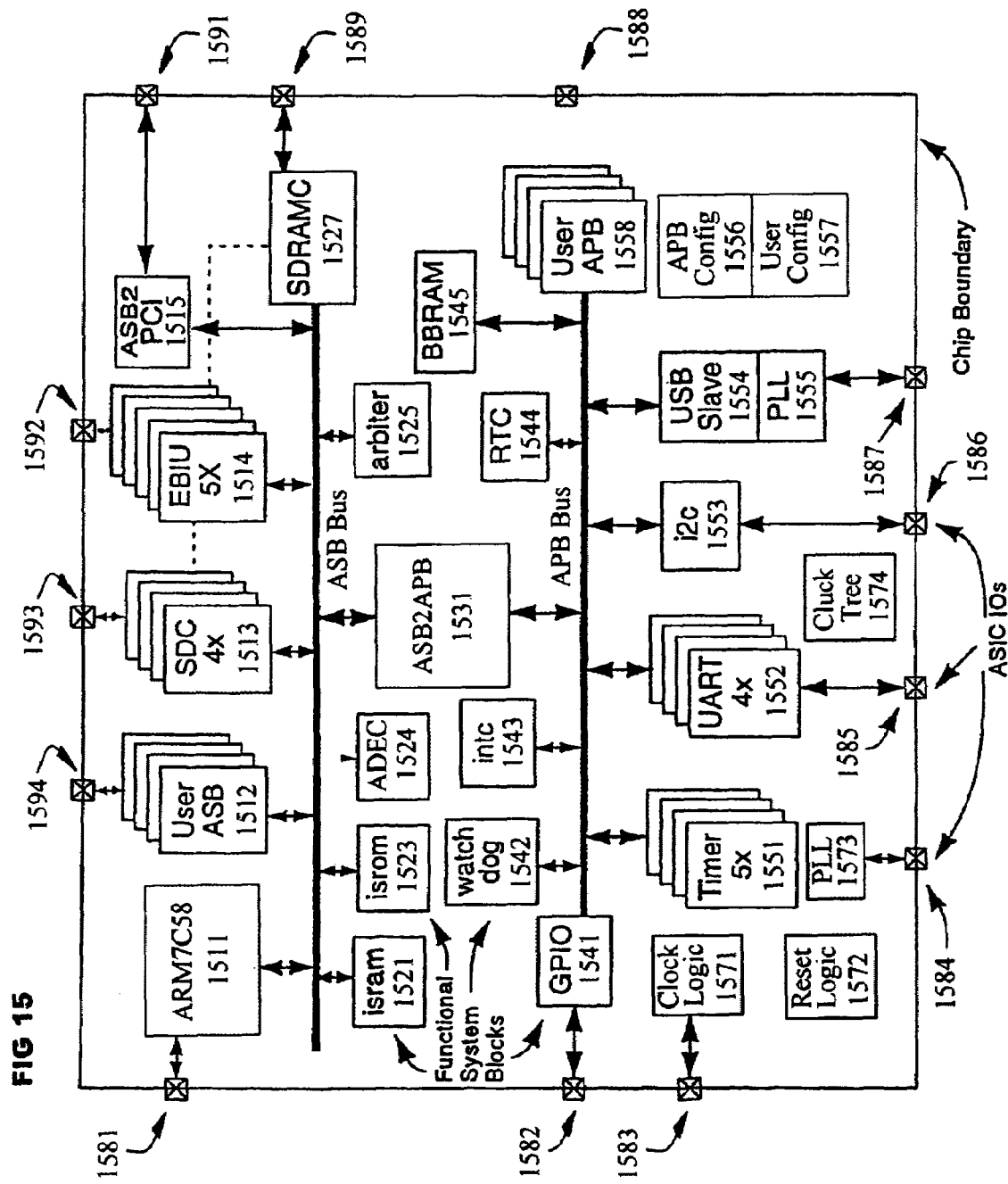
FIG. 15 is a block diagram of an ARM ASIC system architecture, one embodiment of system architecture schematic generated by the present invention.

FIG. 15 is a block diagram of ARM ASIC system architecture 1500, one embodiment of system architecture schematic generated by the present invention. ARM ASIC system architecture 1500 comprises advanced system bus (ASB) circuit blocks "connected" to ASB bus 1571, advanced peripheral bus (APB) circuit blocks "connected" to APB bus 1572 and miscellaneous control circuit blocks. The ASB circuit blocks include ARM Processor (e.g., ARM7CS8) circuit block 1511, user ASB circuit block 1512, static device controller (SDC) circuit block 1513, external bus interface unit (EBIU) circuit block 1514, advanced system bus to peripheral component interconnect (ASB2PCI) bridge circuit block 1515, synchronous dynamic random access memory SDRAM controller (SDRAMC) circuit block 1527, internal static random access memory (ISRAM) circuit block 1521, internal static read only memory (ISROM) circuit block 1523, address decoder (adec) circuit block 1524, and arbiter circuit block 1525. The advanced peripheral bus (APB) circuit blocks include general peripheral input output (GPIO) circuit block 1541, watch dog circuit block 1542, interrupt controller (INTC) circuit block 1543, real time clock (RTC) circuit block 1544, battery backed random access memory (BBRAM) circuit block 1545, timer circuit block 1551, universal asynchronous receiver transmitter (UART) 1552, i2c interface 1553, universal serial bus (USB) 1554-phase lock loop (PLL) 1555, and user APB device 1558. Miscellaneous control circuit blocks comprise clock logic circuit block 1571, reset logic circuit block 1572, phase lock loop (PPL) circuit block 1573, clock tree circuit block 1574, APB configuration circuit block 1558, user configuration circuit block 1557 and ASIC IOs 1581 through 1594.

Figure 16:
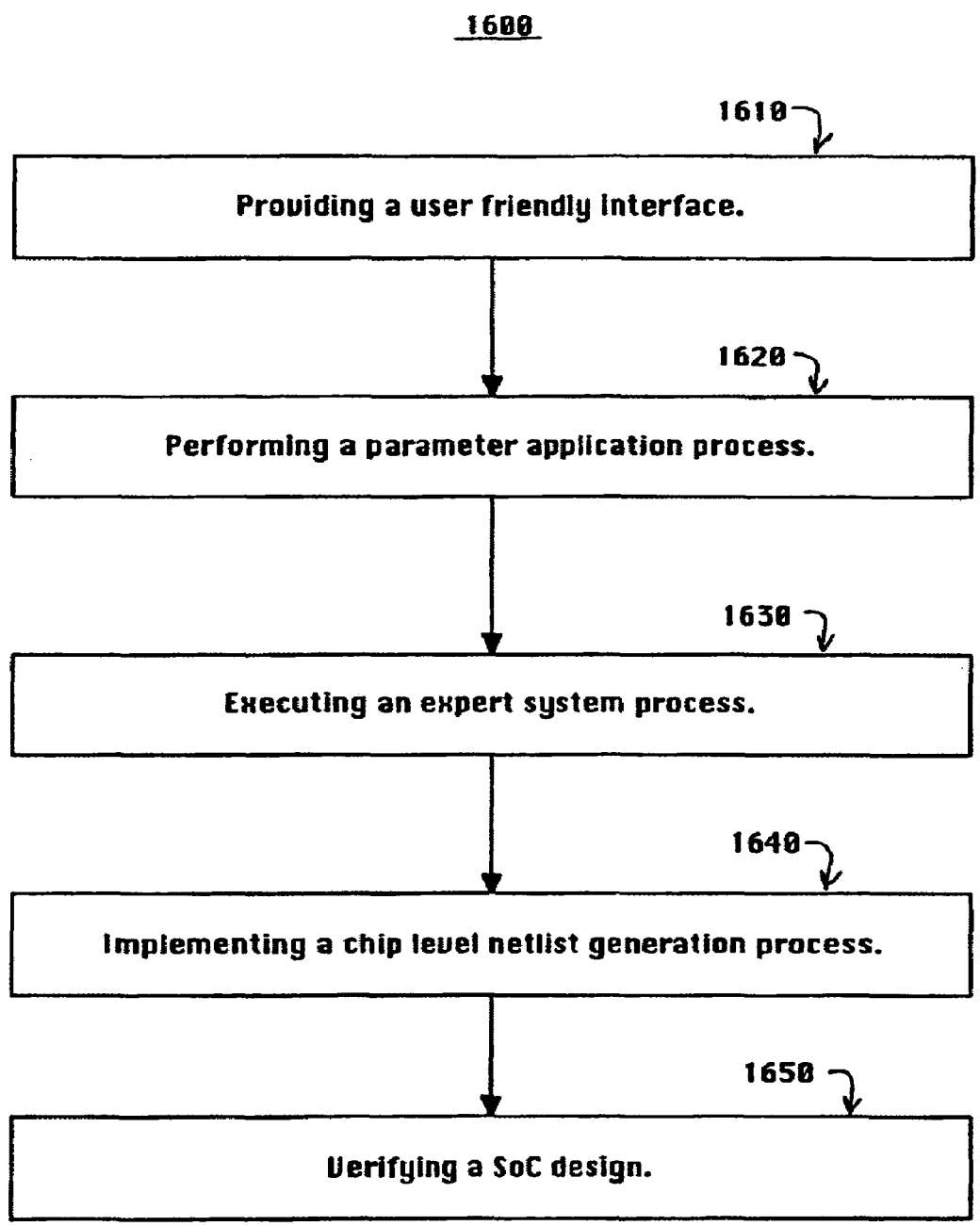
FIG. 16 is a flow chart of one embodiment of a present invention SoC netlist builder and verification computer method.

FIG. 16 is a flow chart of SoC netlist builder and verification computer method 1600, one embodiment of the present invention. SoC netlist builder and verification computer method 1600 is a computer implemented method that facilitates SoC design and verification by providing significant automation of a number of operations including circuit block integration, parameter assignment, addition of architecture features, verification testing and production test support. SoC netlist builder and verification computer method 1600 enables a user to convey information conveniently in a manner that minimizes the amount of data a user has to enter manually while adequately describing features of the circuit being designed or analyzed. SoC netlist builder and verification computer method 1600 facilitates the automated provision of design features based upon prior experience associated with actual SoC hardware design, manufacturing and verification. The present invention facilitates the automated creation of netlist description files and logical verification environments including chip models and system level models for testing operations.

In Step 1610 a user friendly GUI is provided (e.g., by user interface module 310) to assist the easy entry and modification of user selections and parameters. The GUI presents SoC netlist building and verification information in a convenient and easy to use manner. In one embodiment of a present invention, standardized circuit blocks and parameterization options are presented (e.g., by a GUI). In another embodiment, batch code text is interpreted by SoC netlist builder and verification computer method 1600.

In step 1620 a parameter application process is performed. In one embodiment of the present invention, an underlying structure list is created based upon information supplied by a user via the GUI provided in step 1610. In one embodiment of the present invention, a parameter application process initializes a corresponding string for each selected circuit block (e.g., a timer). For example, a parameter application command line string required to generate the selected block circuit (e.g., a timer) from a hardware description language (e.g., HDLi) is initialized and operations for a circuit block (e.g., a timer) that a user selected are processed. An instance specific copy of the parameterizable command line string is made. A parameter application process then updates the specific copy of the parameterizable command line string with parameters received for that particular instance. The parameter application process then appends the circuit block attributes to other files. In one exemplary implementation, a circuit block (e.g., a clock) directory is appended to a list of libraries and also appended to a list of categorized devices (e.g., APB devices). In one embodiment of the present invention, the gate count of a circuit block is added to the list of gate counts for the IC.

In one embodiment of the present invention, the parameter application process generates an internal integration list associated with the circuit block. The internal integration list is utilized in the processing of other routines included in SoC netlist builder and verification computer method 1600. In one exemplary implementation, an internal integration list includes internal signals definitions (e.g., sgn1_name), any assignments or initializations that must be performed for proper circuit operation (e.g., assign_list), clocks (e.g., clk_dst_name), interrupts (e.g., intr_src) and resets (e.g., rst_dst_name) coupled to the device, and how the device is instantiated and coupled in the chip level netlist (e.g., info). The generation of these lists is based on the user parameterization of the device.

In one embodiment of the present invention, SoC netlist builder and verification computer method 1600 also executes an extraction process in step 1620. The extraction process extracts circuit block descriptions from a storage location based upon the parameterized information received from the parameter application process. In one embodiment of the present invention, an SoC netlist builder and verification method utilizes a hardware description language (e.g., HDLi) tool to extract a circuit block (e.g., a timer) using a parameterized command line string provided by the parameter application process. In one embodiment of the present invention, circuit block information is extracted from a database comprising circuit block descriptions of previously utilized and tested circuit blocks (e.g., verified in silicon). In one embodiment of the present invention, an extraction process also facilitates incorporation of non standard custom designed circuit block. For example, SoC netlist builder and verification computer method 1600 provides hooks and handles for a user to assist incorporation of specially designed circuit blocks into a design.

In step 1630, an expert process is performed that facilitates SoC netlist construction and verification. The expert process includes receiving high level configuration information from step 1610, determining circuit block descriptions included in the indicated configuration, and providing parameters associated with the circuit block descriptions. The expert process utilizes extensive information associated with a given architecture and expert system algorithms that apply probabilities associated with certain features of a SoC to determine circuit block descriptions and parameters included in a design. The expert system module In one exemplary implementation the expert process retrieves the circuit block descriptions and parameter information from a storage medium (e.g., a data base). In one embodiment of the present invention, the expert process relies upon information associated with previous experience building a SoC to determine circuit block descriptions included in the configuration and to provide parameters associated with the circuit block descriptions.

In step 1640, SoC netlist builder and verification computer method 1600 implements a chip level netlist generation process. A chip level netlist generation process creates an IC core level netlist in a desired location based on data structures that were populated in other routines of an SoC netlist builder and verification computer method 1600 of the present invention. In one embodiment of the present invention, chip level netlist generation process creates hardware description language VHDL or Verilog code that will automatically perform the task of "connecting" circuit blocks together. In one exemplary implementation of the present invention, the VHDL or Verilog code is based upon a signal name list (e.g., sgnl_name list) comprising a list of internal signals that are generated by SoC netlist builder and verification computer method 1600 to achieve proper connectivity. In one embodiment of the present invention, chip level netlist generation process provides signal declarations. The chip level netlist generation process generates required HDL continuous assignment statements in accordance with an assignment list (e.g., assign_list) and based upon an instantiation list (e.g., inst_list) chip level netlist generation process generates the HDL code that will instantiate each of those components. In one embodiment of the present invention an instantiation list includes directions on the way a device is instantiated and connected.

In step 1650, a SoC design is verified. Step 11650 includes a verification process that automatically generates a test bench and a logical verification environment including simulation models (e.g., a chip model and a system level model). In one embodiment of the present invention, the verification process automatically provides test bench stimuli information used to verify the functionality of a design. In one embodiment of the present invention, manufacturing testing information is also supplied. For example the verification process creates a declaration of a device under test (DUT) including a definition of the internal signals, a component declaration of the DUT with constant definitions (e.g., a clock period duration), values for DUT input ports, and models of external components for functional environmental testing.

Figure 17:
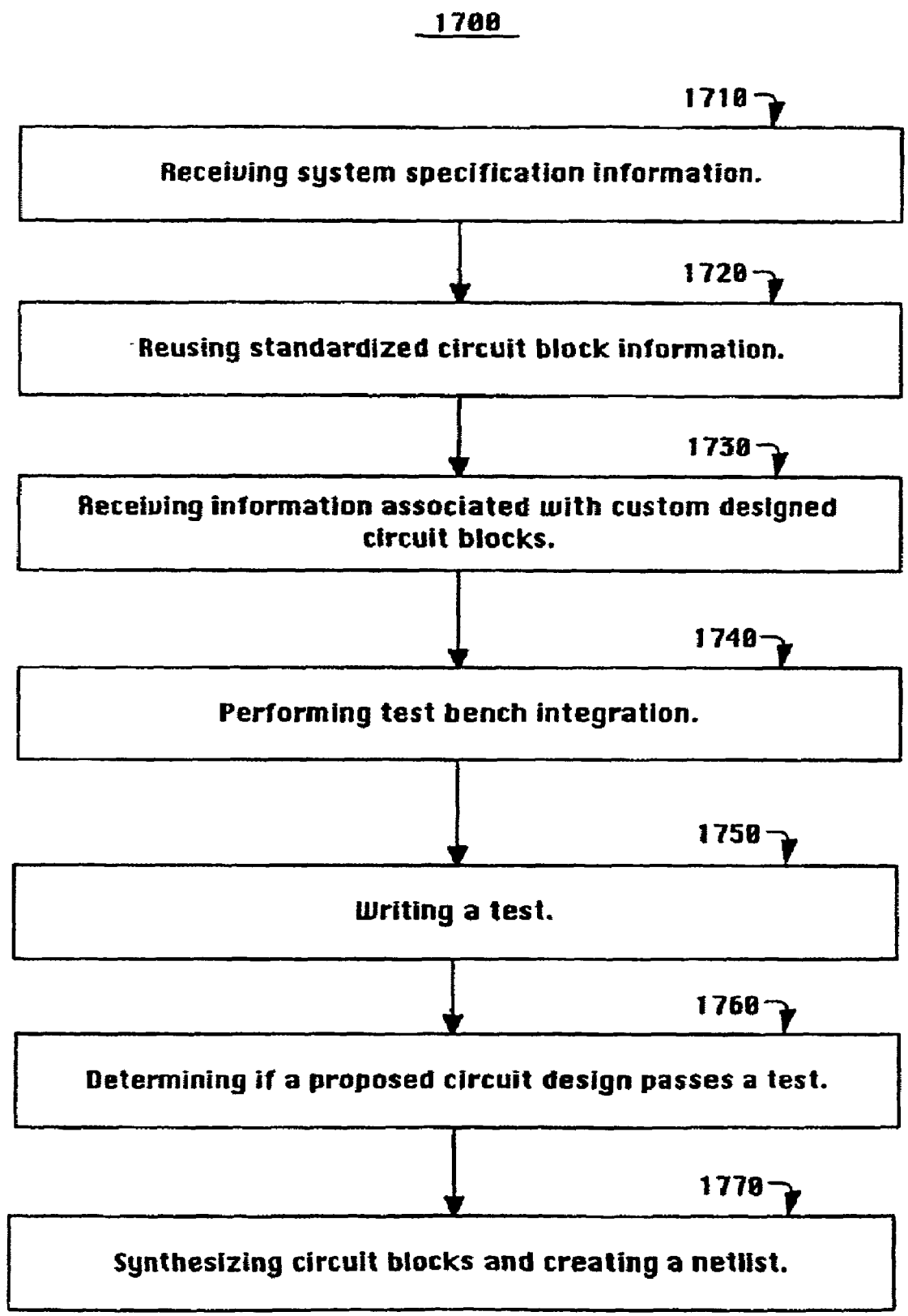
FIG. 17 is a flow chart of an SoC netlist builder and verification computer method, one embodiment of the present invention.

FIG. 17 is a flow chart of SoC netlist builder and verification computer method 1700, one embodiment of the present invention. SoC netlist builder and verification computer method 1700 also facilitates generation of an IC netlist and associated files (e.g. a standardized directory structure for IC designs, test bench, simulation models, tests, etc.). SoC netlist builder and verification computer method 1700 is an iterative process involving functions performed by a present invention integrated circuit (IC) SoC netlist builder and verification system and method based upon inputs from a user. A present invention SoC netlist builder and verification system and method facilitates communications between a user and an SoC netlist builder and verification system and method.

In step 1710, system specification information is received. In one embodiment of the present invention system specification information is received via a present invention GUI. A user begins by defining a design at a high level and setting forth some basic parameters which are received in step 1710.

In step 1720 standardized circuit block information is reused. Based upon the information provided by a user in step 1710, SoC netlist builder and verification system method 1700 retrieves appropriate information from storage sources such as library or information folders. In one embodiment of the present invention standardized circuit block information is included in a database of silicon verified circuit block descriptions.

In step 1730 information associated with custom designed circuit blocks is received.

In step 1740 test bench integration is performed. SoC netlist builder and verification method 1700 processes the information and generates a detailed description of a circuit or system being designed and verified.

In step 1750, tests are automatically written. The tests are based upon user supplied information associated with the chip configuration coupled with tests that are reconfigured. In one embodiment of the present invention the test comprises test models that include stimuli in a work station environment.

In step 1760 a determination is made if a proposed circuit design passes a test.

In step 1770 the circuit blocks are synthesized and top level netlist is created. The textual descriptions generated by SoC netlist builder and verification computer method 1700 are utilized in a synthesis process that turns the conceptual textual description of the design into a "logical gate" description. For example, a register transfer level (RTL) functional description file with an implied architecture is translated into a gate level description.

The present invention approach of having a centralized SoC building and verification environment provides numerous advantages. For example, the present invention facilitates much faster time to market and reduction of manual errors associated connecting circuit blocks, creating IOs, test benches etc. The present invention assists standardized chip building methodology and abstraction of a circuit block behavior so that the user does not have to be buried in the myriad of details associate with a description of a device. The present invention facilitates and automate creation of specifications and allows the user to easily experiment with different architectures for gate counts, die sizes, and power estimates for different chip architectures.

Thus, the present invention provides a method to save time, effort, and the risk of associated with introducing human errors in putting a IC chip together. The present invention is a system and method that facilitates efficient and effective creation and modification of electrical circuit designs utilizing existing circuit block designs. The integrated circuit (IC) SoC netlist builder and verification system and method of the present invention automates numersous design and verification operations including automated provision of circuit block descriptions and application of parameters, automated development of test benches and test environments and reduction of data a user has to enter manually to adequately describe features of the circuit being designed or analyzed. The present invention system and method also facilitates modification of IC design features and economically generates circuit description files that assist IC design and analysis.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A System on a Chip (SoC) netlist builder and verification computer system comprising:
   a user interface module for providing user friendly and convenient interfaces that facilitate easy entry and modification of user selections and parameters;
   an expert system module for analyzing information supplied by said user module and automatically providing SoC building and verification data to a parameter application module;
   a parameter application module for applying parameters and developing command line strings based upon information received from said user interface and said expert system;
   a chip level netlist generation module for automatically generating a chip level netlist based upon information received from said user interface module and said expert system module; and
   a verification module for generating a test bench and a logical verification environment automatically including simulation models based upon information interpreted by said parameter application module.

2. The System on a Chip (SoC) netlist builder and verification computer system of claim 1 wherein said parameter application module creates directions passed to other modules for execution.

3. The System on a Chip (SoC) netlist builder and verification computer system of claim 2 wherein said directions passed to other modules for execution includes command lines.

4. The System on a Chip (SoC)_netlist builder and verification computer system of claim 1 wherein said SoC building and verification data provided by said expert system is retrieved from a storage medium comprising a database of building block circuit description files.

5. The System on a Chip (SoC) netlist builder and verification computer system of claim 1 wherein said chip level netlist generation module includes the instantiation of internal integrated circuit (IC) devices and connections between the IC devices for internal signals.

6. The System on a Chip (SoC) netlist builder and verification computer system of claim 1 wherein said user interface module generates user friendly graphical user interfaces (GUIs) to facilitate selection of standardized circuit blocks and parameterization of the selected standardized circuit blocks.

7. In a computer system, a system on a chip netlist builder and verification computer method for facilitating creation and modification of internal integrated circuit (IC) designs utilizing existing circuit block designs, said method comprising the steps of:
   providing a user friendly interface;
   performing a parameter application process;
   executing an expert system process;
   implementing a chip level netlist generation process including core netlist and I/O pin netlists;
   verifying a system on a chip design automatically;
   creating an underlying structure list, wherein creating the underlying structure list comprises,
   interpreting information and commands entred by a user; and
   performing required iterations.

8. The system on a chip netlist builder and verification computer method of claim 7 further comprising the steps of:
   assisting easy entry and modification of user selections and parameters;
   presenting information regarding operations of said SoC netlist builder and verification method to a user; and
   facilitating selection of standardized circuit blocks and parameterization of said selected standardized circuit blocks.

9. The system on a chip netlist builder and verification computer method of claim 8 further comprising the steps of:
   determining which circuit block is selected by a user;
   initializing a parameterizable command line string;
   processing operations for the circuit block a user has requested;
   making an instance specific copy of the parameterizable command line string; and
   updating a copy of the parameterizable command line string with user indicated parameters received for a particular instance.

10. The system on a chip netlist builder and verification computer method of claim 8 further comprising the steps of:
    appending the circuit block attributes to other files; and
    adding the gate count of a circuit block to a list of gate counts for an IC.

11. The system on a chip netlist builder and verification computer method of claim 8 further comprising the steps of:
    generating an internal integration list associated with the circuit block designs; and
    utilizing said internal integration list in the processing of other routines included in the SoC netlist building and verification computer method.

12. The system on a chip netlist builder and verification computer method of claim 8 further comprising the step of extracting circuit block descriptions from a storage location based upon the applied parameter information.

13. The system on a chip netlist builder and verification computer method of claim 8 further comprising the steps of:
    creating an internal integrated circuit (IC) core level netlist in a desired location based on data
    structures that were populated in other routines of said SoC netlist builder and verification computer method; and
    generating hardware description language VHDL or Verilog code that automatically performs the task of coupling circuit blocks together.

14. The system on a chip netlist builder and verification computer method of claim 8 further comprising the steps of:
provicing signal declarations;
producing required HDL assign statements in accordance with an assignment list; and
generating the HDL code that will instantiate the signal declarations and HDL assign statements_based upon an instantiation list.

* * * * *